UNITED STATES PATENT OFFICE.

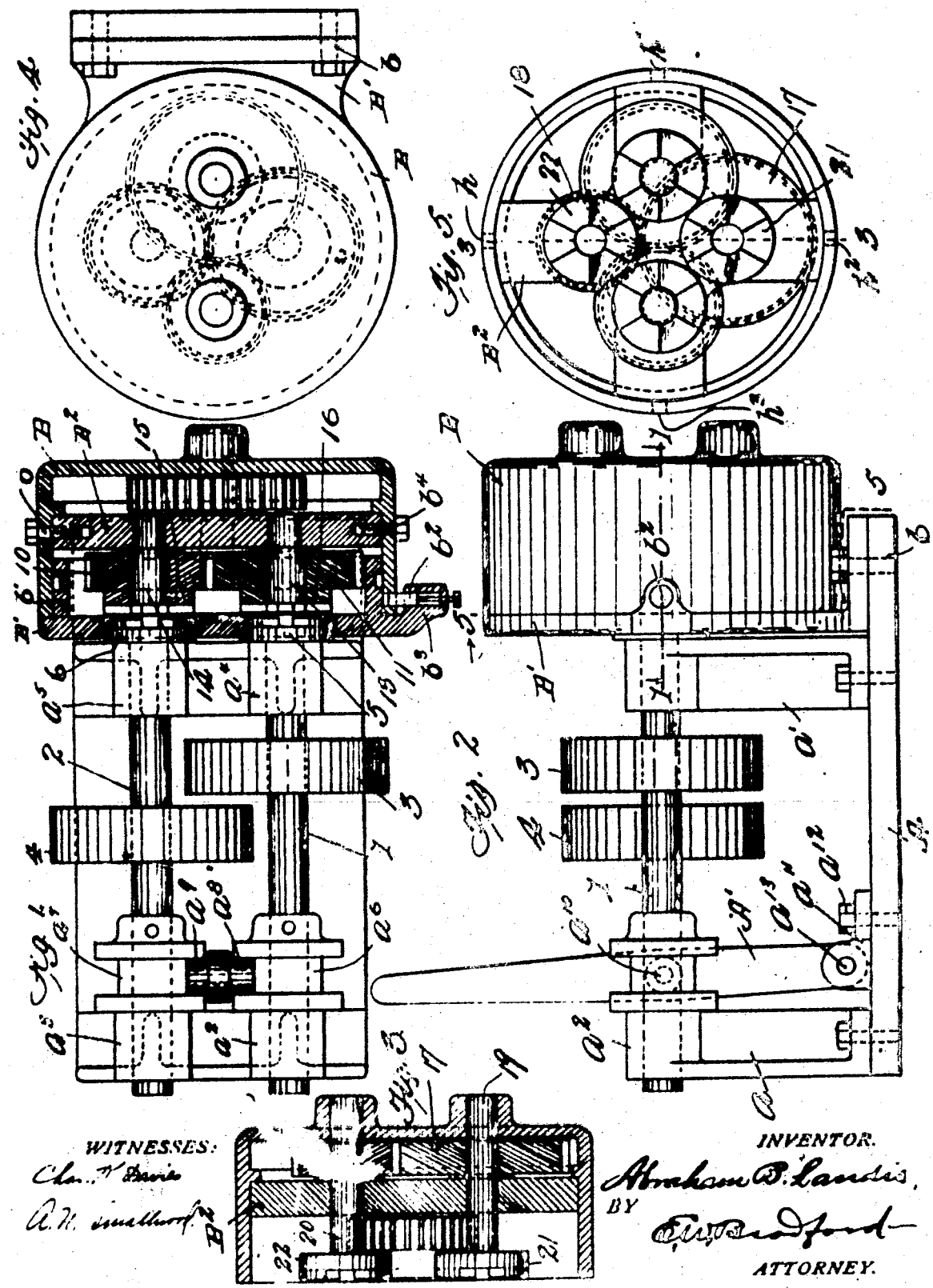

ABRAHAM B. LANDIS, OF WAYNESBORO, PENNSYLVANIA.

CHANGE-SPEED GEARING.

948,892.

Specification of Letters Patent.

Patented Feb. 8, 1910.

Application filed April 19, 1907. Serial No. 369,149.

*To all whom it may concern:*

Be it known that I, ABRAHAM B. LANDIS, a citizen of the United States, residing at Waynesboro, in the county of Franklin and State of Pennsylvania, have invented certain new and useful Improvements in Change-Speed Gearing, of which the following is a specification.

My said invention consists in an improved construction of change-speed gearing whereby several speeds may be secured with comparatively few gear wheels and only those in actual use be in motion, all as will be hereinafter more fully described and claimed.

Referring to the accompanying drawings which are made a part hereof and on which similar reference characters indicate similar parts; Figure 1 is a top or plan view of the base for supporting the shafts and the gearing casing, said gearing casing and part of the gearing therein being shown in section as seen when looking in the direction indicated by the arrows from the dotted line 1—1 in Fig. 2, Fig. 2 a side elevation of the same, Fig. 3 a cross section on the dotted line 3—3 in Fig. 5, Fig. 4 an end view, and Fig. 5 a view on the dotted line 5—5 in Fig. 2.

In said drawings the portions marked A indicate the supporting base, and B the casing for the change-speed gearing. The base A is or may be the appropriate part of any machine where such gearing is to be used, or a casting suitable for the purpose and especially designed therefor to be mounted and secured wherever needed for the employment of the mechanism. It has an upright bracket or stand $a$ at one end and $a'$ at the opposite end at the top of each of which are formed bearings $a^2$, $a^3$, $a^4$ and $a^5$ for the shafts 1 and 2, which are journaled in said bearings. Said shafts are provided with belt pulleys 3 and 4 respectively by which power may be applied to either shaft from any convenient source. Said shafts are parallel and preferably located in the same plane and each is adapted to slide longitudinally in its respective bearings. Shaft 1 is provided with a collar $a^6$ and shaft 2 with a collar $a^7$ located adjacent to each other and formed with circumferential grooves with which anti-friction rollers $a^8$ and $a^9$ journaled on the opposite projecting ends of a shaft $a^{10}$, which projects through a lever A', are adapted to engage. Said lever A' is pivoted at its lower end on a pivot $a^{13}$ in a bracket $a^{14}$ secured by a bolt $a^{12}$ to the base A. The inner ends of said shafts 1 and 2 are each formed with a clutch-part, 5 and 6 respectively, formed with transverse grooves in their faces, as shown in Fig. 1.

The casing B comprises a hollow cylindrical casting adapted to inclose the gear wheels. It is mounted on a bracket B' in the form of a disk secured in the base A by means of bolts $b$ which extend through a flange in the bottom thereof into said base. Said part B' thus forms the inner end or head of said casing B. It is formed with an annular flange $b'$ which extends inside of said part B and is adapted to support said part and permit it to be turned thereon. Said part B is secured to said part B' by means of a pawl or detent $b^2$ mounted in a bracket $b^3$ on one side of said part B' and adapted to extend through a perforation in said part B. Said part B' has openings in line with the shafts 1 and 2 and of a size to receive the clutch-parts 5 and 6. A spider or plate B² of the form most clearly shown in Fig. 5, is secured in the casing B by means of screw-bolts $b^4$. In the several arms of said spider are formed bearings for the several shafts of the gear wheels contained in said casing. On the front side of said spider B² are mounted gear wheels 10 and 11 on stud shafts 13 and 14, respectively, which shafts are journaled in a horizontal line with each other in bearings in said spider B². Said gear wheels are of different sizes and mounted to mesh with each other. On the front side of each of said gear wheels 10 and 11 is formed a clutch-part 15 and 16, respectively, having radial tongues or ribs on their faces corresponding to the grooves in the clutch-parts 5 and 6 on the shafts 1 and 2 with which they are adapted to be coupled by means of the lever A' by which said shafts are moved endwise to engage said clutches. On the opposite side of said spider B² are mounted gear wheels 17 and 18 of different sizes and of sizes different from the sizes of the wheels 10 and 11 on shafts 19 and 20. Said wheels 17 and 18 are journaled in bearings in the outer end of said casing B as well as in bearings in the spider B², as shown most clearly in Fig. 3. Said shafts extend through said spider and have clutch-parts 21 and 22 on their inner ends formed with tongues or ribs on their faces similar to those of the other clutch-parts and also adapted to couple to the clutch-parts 5 and 6 by the interengaging of said clutch-parts when the shafts are slid endwise to bring them to proper position. The casing B is formed with four notches or holes h, h', h² and h³ with either one of which the pawl b² may engage when the casing B is turned to bring one or the other hole to position.

It will be seen that the several gear wheels 10, 11, 17 and 18 are disposed at right angles with each other so that each quarter turn of the casing B on the flange b' of the part B' will bring clutch-parts of different wheels to register with the clutch-parts of the shafts 1 and 2. In operation, therefore, when it is desired to change from one speed to another, the clutches coupling the shafts 1 and 2 to the gear wheels within the casing are separated by means of the lever A' moving said shafts endwise and the casing B is turned, the detent b² being first disengaged, to bring the gear wheels into register with the shafts which will produce the desired speed when the clutches are again brought together coupling the shafts to said wheels. To illustrate, in the arrangement shown in Fig. 1, shaft 1 being the driving shaft, power would be applied to the pulley 3 which through the gear wheel 11 will drive gear wheel 10 and the driven shaft 2 at a certain speed. While these gear wheels are in operation gear wheels 17 and 18 not only are idle but are not in motion. Should the power be applied to shaft 2 through pulley 4 and shaft 1 be used to transmit the motion, a different speed would be secured. The same speed could be secured by uncoupling the shafts from the gear wheels, disengaging the pawl b², and giving the casing B a half turn, which would bring gear wheel 10 into position to couple with shaft 1 and gear wheel 11 into position to couple with shaft 2. Two speeds may thus be secured by the use of only the two gear wheels without the other wheels being in motion. By giving the casing B a quarter turn to bring the clutch-parts 21 and 22 into position to couple to the shafts 1 and 2, two other speeds are made possible in the same manner and the gear wheels 10 and 11 will be idle and without motion. Thus by the use of only four gear wheels of different sizes four different speeds can be secured and either shaft may be used as a driving shaft and the other as the driven shaft for transmitting the motion, while the gear wheels not in actual use are allowed to stand idle and thus save not only the power and the wear which is usual when all of the wheels in the differential casing are in motion but also avoid the noise incident to such motion.

Having thus fully described my said invention, what I claim as new and desire to secure by Letters Patent, is:

1. In a change-speed gearing, the combination, of a pair of shafts adapted to receive and transmit the motion, a rotatable gear casing mounted adjacent to the ends of said shafts, several shafts connected in pairs by gears of varying sizes mounted therein, one shaft of each pair being arranged to "line" with one of the first mentioned pair, and clutch parts on the adjacent ends of said several shafts, those of the first mentioned pair adapted to be coupled interchangeably with those of each pair within said casing, substantially as set forth.

2. In a change-speed gearing, the combination, of a pair of shafts journaled in bearings on suitable supports, a casing, several pairs of gears mounted in said casing adjacent to the ends of said shafts, said casing being mounted to rotate to bring different pairs of said gears into register with said shafts, and clutch parts on the adjacent ends of said shafts for coupling said pair of shafts to one or the other pair of said gears, substantially as set forth.

3. In a change-speed gearing, the combination, of the shafts mounted side by side in bearings on suitable supports, a gear casing, several pairs of gears mounted on shafts in said casing, said shafts, one of each pair being adapted to be brought into alinement with one of said other shafts, and clutch parts on the adjacent ends of said shafts for coupling the gear shafts to said main shafts interchangeably, substantially as set forth.

4. In a change-speed gearing, the combination, of the two shafts mounted in suitable bearings, the gear casing mounted adjacent to the ends of said shafts, several pairs of gears in said casing mounted on shafts, said shafts adapted to be coupled to said main shafts, said casing being mounted to be rotatably adjusted, whereby the shafts of each pair of gears may be brought into alinement with said main shafts, and means for coupling the shafts of said gears to said main shafts, substantially as set forth.

5. In a change-speed gearing, the combination, of the support, the bearings mounted thereon, a pair of shafts mounted adjacent to each other in said bearings having clutch-parts on their inner ends, a gear casing formed with openings to receive said clutch-parts, one part of said gear casing being formed to turn upon the other part, several pairs of shafts in said rotary part, gears mounted on and connecting each pair of shafts, each of the shafts having a clutch-part adapted to be coupled to one of the main shafts, and means for securing said rotary part of the casing in different adjustments, substantially as set forth.

6. In a change-speed gearing, the combination, of the supports having the bearings, the main shafts mounted adjacent to each other in said bearings, a rotary gear casing mounted adjacent to the ends of said shafts, means for securing said casing in the desired rotary adjustment, several pairs of gears mounted on shafts, said shafts, clutch-parts on the adjacent ends of said shafts for coupling said gear shafts in sets to said main shafts, and the coupling mechanism, substantially as set forth.

7. In a change-speed gearing, the combination, of the supports, the main shafts mounted alongside each other in bearings therein, a rotary gear casing, several pairs of gears mounted on short shafts therein, said short-shafts, said several gears being of different sizes, and means for coupling the ends of the shafts of each pair of gears to said main shafts interchangeably, substantially as set forth.

8. In a change-speed gearing, the combination, of the main shafts mounted side by side in bearings on suitable supports, said supports, a pulley mounted on each of said shafts, a clutch-part on the end of each shaft, a gear casing adjacent to the ends of said shafts containing a pair of gears each gear having a clutch-part, said gears and means for coupling the clutch-parts of the shafts to the clutch-parts of the gears, substantially as set forth.

9. In a change-speed gearing, the combination, of the main shafts suitably supported, the rotary gear casing mounted adjacent to the ends of said shafts, said gear casing having a frame or spider therein containing bearings for several pairs of shafts at the same distance apart as the main shafts, said spider, several pairs of gears mounted on said shafts, and means for coupling one or the other of said pairs of gears direct to said main shafts, substantially as set forth.

10. In a change-speed gearing, the combination, of the base, the bearings, the main shafts mounted in said bearings, each shaft having a clutch-part on its inner end, the rotary gear casing adjacent to the ends of said shafts comprising a fixed part mounted on said base and a rotary part mounted on said fixed part, a support in said rotary part for the shafts of several pairs of gears, said several pairs of gears mounted on shafts in said support, said shafts, each pair of said gears being arranged to couple to said main shafts and formed with clutch-parts for the purpose, and the coupling mechanism, substantially as set forth.

In witness whereof, I, have hereunto set my hand and seal at Waynesboro, Pa., this 13th day of April, A. D. nineteen hundred and seven.

ABRAHAM B. LANDIS. [L. S.]

Witnesses:
SHERMAN A. MILLER,
GEORGE H. DICKEL.